(No Model.)
H. R. ANGUS.
PROCESS OF TREATING AND IMPROVING PETROLEUM DISTILLATE.
No. 301,469. Patented July 8, 1884.
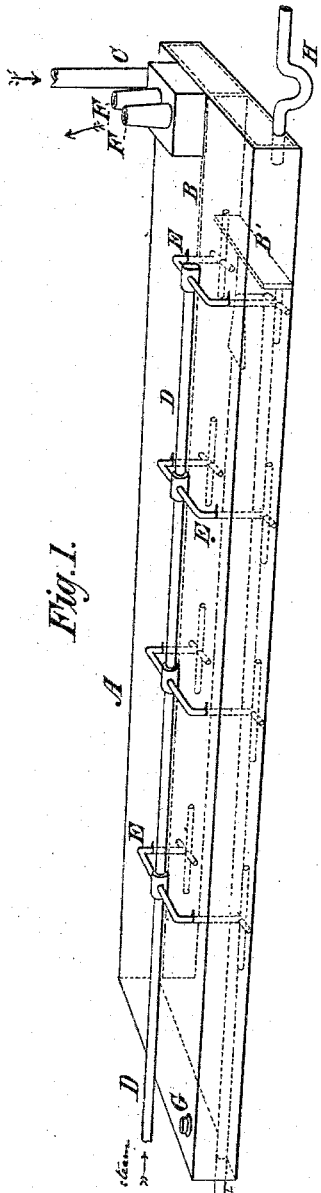
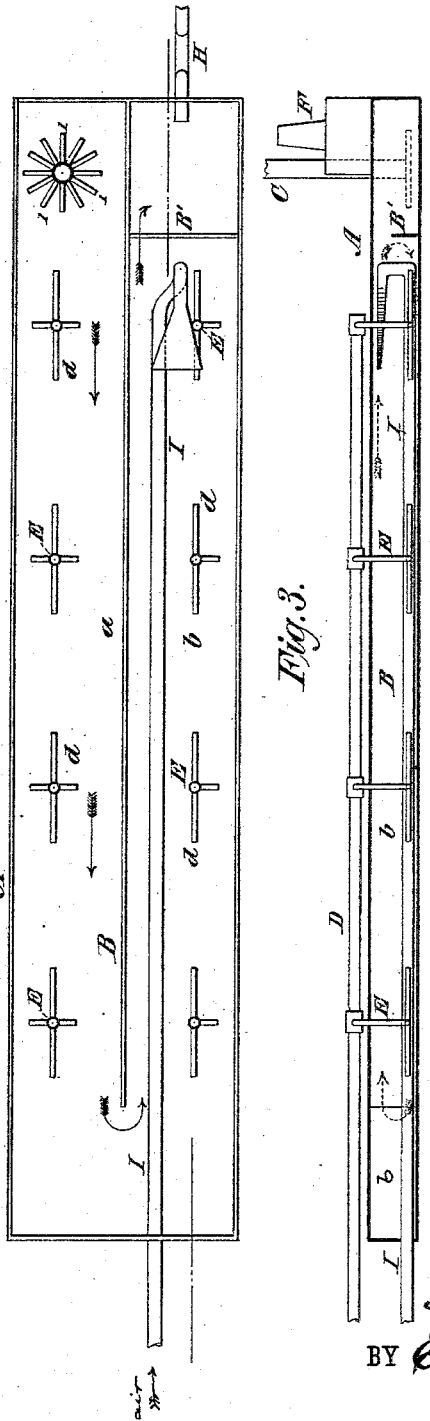
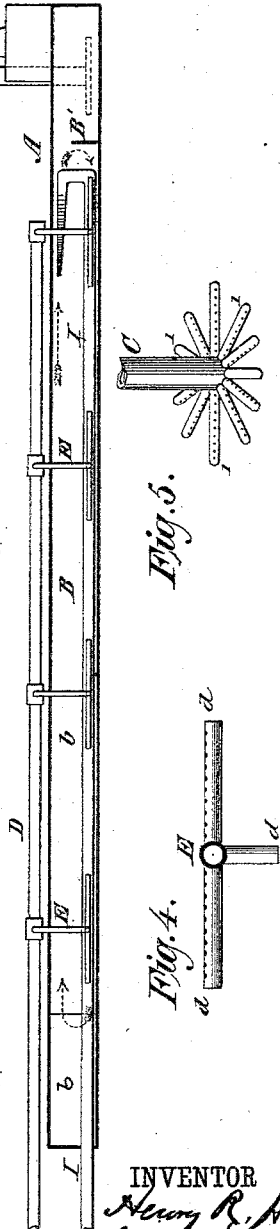
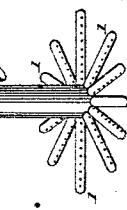
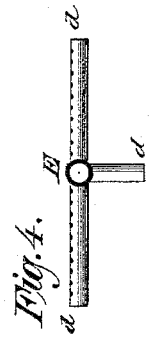
WITNESSES:
Gustave Dieterich
Fred Hauswohl
INVENTOR
Henry R. Angus
BY Carle H. Smith
ATTORNEY

UNITED STATES PATENT OFFICE.

HENRY R. ANGUS, OF NEW YORK, N. Y., ASSIGNOR OF ONE-HALF TO DANIEL MESSMORE, OF SAME PLACE.

PROCESS OF TREATING AND IMPROVING PETROLEUM DISTILLATE.

SPECIFICATION forming part of Letters Patent No. 301,469, dated July 8, 1884.

Application filed September 24, 1883. (No model.)

*To all whom it may concern:*

Be it known that I, HENRY R. ANGUS, of New York, N. Y., have invented a new and useful Process of Treating and Improving Petroleum Distillate and other Oils, whereof the following is a specification.

My invention relates to the treatment of oils for carrying off the light vapors and volatile products for subsequent condensation. It is particularly applicable to petroleum distillate for eliminating the volatile components thereof, in order to enhance its capability for sustaining the flame-test; but it is useful in deodorization of oils, and for other purposes.

In the treatment of petroleum distillate by steam for improving the fire-test thereof, it has been the practice prior to my invention to take the high-grade distillate and heat it by live steam applied directly thereto, the effect of which is to liberate the light vapors and gases, which are conducted away and condensed as naphtha. More recently it has been proposed to float a thin layer of oil on the surface of water, heated (not by live steam, but) by steam-heated pipes at the bottom of the tank containing the water, and at the same time blowing air over the surface of the oil to carry off the vapors and gases generated by the heated pipes, as seen in the patent of Henry C. Smith, No. 268,302, dated November 28, 1882. The objection to the first-named plan is twofold—it is slow and tedious, and the oil is often discolored from overheating by the live steam applied directly to the oil, which discoloration reduces its value, and a large percentage is lost. The objection to the last-named plan is that the heat from the pipes in the tank of water causes a rapid evaporation of the water, requiring the operation to be frequently interrupted for renewal of the supply, and this, together with the extremely sluggish movement of the oil over the water, renders it very difficult to conduct the operation with such celerity as to make it commercially profitable.

My new process overcomes all these difficulties. It may be considered as of three divisions, the first two of which may or may not be combined in one operation with the third; and it therefore consists, first, in floating the oil or distillate upon a body of heated water in a closed tank or chamber, and imparting motion to the water from the inlet for the oil toward the outlet, whereby the transit of the oil under treatment is accelerated and the process expedited; secondly, in floating the oil or distillate on a body of heated water in a closed tank or chamber, continuously introducing water into the tank or chamber beneath the oil, (in the form of steam or otherwise,) so as to raise the level of the water on which the oil is so floated, and at the same time continuously drawing off the surplus water from the surface at the exit for the oil, whereby motion is imparted to the oil, causing it to flow toward the exit therefor; thirdly, in floating the oil in a thin layer upon the body of water, heating the water by introducing and condensing live steam directly therein, drawing off the surplus water to impart motion to the oil, and at the same time forcibly removing the volatile products generated by and rising above the heated water and oil, whereby the process is rendered speedy, continuous, and uninterrupted.

In conducting the aforesaid process, I do not confine myself to the particular mode indicated of heating the water, or of imparting motion thereto, nor do I wish to be restricted to a special mode of removing the generated volatile products or vapors, as this may be done either by blowing air over the oil or by exhaustion.

In the annexed drawings I have shown apparatus adapted for conducting said process, consisting of a closed tank having inlet and outlet pipes, and other appurtenances for supplying and manipulating the oil, water, steam, &c.

Figure 1 is a perspective view of the exterior, indicating the interior structure and parts in dotted lines. Fig. 2 is a plan or top view of the interior of the tank and partitions. Fig. 3 is a longitudinal section of one division of the tank. Fig. 4 is a fragment of terminal steam-pipe enlarged. Fig. 5 shows the multiple branches of oil-distributing pipe.

A is the closed tank or chamber. It is divided into two compartments, *a* and *b*, and the latter is divided laterally by a cross-partition, B', about one-half the height of the interior, and this governs the level or height of the water, being practically the termination or discharge end of the water-tank proper. The vertical longitudinal partition B is hermetically joined both to the bottom and top of the interior. It is however united to one end only of the tank, and does not reach to the opposite end, and thus the two compartments are so united that in the conduct of the refining process the interior is to be considered as of a box about half the width of the exterior, and, say, twice the length.

The oil is introduced through a pipe, C, arranged to discharge into the tank near the bottom at the closed end of one of the compartments, a, and in operation passes around into the other, b, and thence out. I prefer to introduce the oil into the heated water in a finely-divided condition. For this purpose, the inlet-pipe C terminates in multiple branches 1, and for a further division the branches have perforations in the sides or underneath. From these branches the oil is delivered in small globules, which rise through the heated water to the surface, and there unite to form a thin film or layer. The effect is that the heat of the water begins to act immediately upon the oil thus subdivided, and raises its temperature to that of the water while passing up through it, as described.

D is the main supply-pipe of the steam for heating the water. The pipe is led along the top of the tank, and has a number of branches, E, which pass down into the tank nearly to the bottom, and each branch terminates, preferably, in a number of nozzles and openings, d, of such form or structure as will so facilitate the condensation of the steam in the water contained in the tank that the water will be maintained at the desired temperature without producing ebullition at its surface.

To remove the volatile products evolved in the process, I use a fan either to force a current of air through the vapor-chamber, or to exhaust the air from the said chamber, and remove the vapors, &c., by suction.

In the drawings, I is a pipe for an inflowing current of air. The pipe enters that end of the tank opposite oil and water outlet, and is carried to the partition or bulkhead B, passing close to the discharging ends d of the steam-pipes E, then rises above the level of the water and oil thereon, and has the open end flattened, so that the air emitted is spread over the surface of the oil from side to side of the compartment. By arranging the air-pipe in close proximity to the discharging steam-pipes the air coming in is heated far more quickly and a much shorter pipe can be used than would be necessary if only the hot water in the tank were employed to heat such pipe.

The tank is filled with water through an orifice, as G, to the height of the partition or bulkhead B', and the orifice has a screw-cap for closing it.

In operation, the steam is first turned on, and the water as well as the whole apparatus heated to the desired temperature, which will vary with the volatile quality of the oil or distillate, not usually lower than 100° nor higher than 200° Fahrenheit. As the steam comes in it is condensed by the water, and adds to its volume, raising its level and causing it to flow off over the top of the bulkhead B', thus imparting motion to the surface of the water toward the outlet H. A result of this current at the surface is to induce a downward movement of the water immediately below the top of the bulkhead B', and thence a return undercurrent at the bottom of the tank, producing an active circulation of the whole body of water, somewhat as indicated by the dotted arrows in Fig. 3. When the oil is let in through the inlet-pipe, it is discharged near the bottom of the tank, and rises to the surface of the water, forming a thin layer thereon, which immediately partakes of the movement of the water and (as indicated by arrows in Fig. 2) follows its motion around the partition B toward the outlet H, flowing with the water over the bulkhead B' into the well or space between the bulkhead and the end of the tank. Meantime the vapors and gases evolved by the heat and rising from the oil are continuously expelled through the vapor-pipes F F, or otherwise removed.

The outlet-pipe is formed of a "trap" shape in order to retain sufficient fluid to prevent the escape of vapors, &c., by the way of the well.

The tank may be made narrower and longer than shown, and the longitudinal partition be dispensed with. On the other hand, two or more partitions may be used, and the tank may be made wider.

Having thus described my new process, and also a mode and apparatus for conducting the same, I disclaim the apparatus, as that is to be the subject of another patent of even date herewith, and

I claim as my invention—

1. In a process of refining petroleum distillate, floating the oil or distillate upon a body of heated water in a closed tank or chamber, and at the same time imparting motion to the water from the inlet for the oil toward the outlet, for the purposes specified.

2. In the process of refining petroleum distillate, floating the oil on heated water in a closed tank, continuously introducing steam or heated water therein, and simultaneously flowing off the water from the surface at or near the outlet, whereby motion is imparted to the water, and the oil thereon is conveyed toward the outlet, as set forth.

3. The process of refining distillate, which consists in floating the oil on heated water in a closed tank, continuously introducing steam or heated water therein, flowing off the surplus water at the surface to impart motion to the oil toward the outlet, and at the same time forcibly removing the volatile products generated from the oil, the process and operation being substantially as described.

HENRY R. ANGUS.

Witnesses:
JAMES M. TULLY,
EARLE H. SMITH.